United States Patent [19]
Denton

[11] Patent Number: 5,385,700
[45] Date of Patent: Jan. 31, 1995

[54] METHOD OF MAKING A HOLDER OF CERAMIC MATERIAL

[75] Inventor: Ivor E. Denton, Wantage, England

[73] Assignee: Programme 3 Patent Holdings, Luxembourg, Luxembourg

[21] Appl. No.: 875,780

[22] Filed: Apr. 29, 1992

[30] Foreign Application Priority Data

May 3, 1991 [GB] United Kingdom ............... 9109678
Jul. 24, 1991 [GB] United Kingdom ............... 9110659

[51] Int. Cl.⁶ .............................................. C04B 33/32
[52] U.S. Cl. ........................................ 264/59; 264/63; 264/317
[58] Field of Search ............................. 264/59, 63, 317

[56] References Cited

U.S. PATENT DOCUMENTS

| | | | |
|---|---|---|---|
| 2,448,930 | 9/1948 | Stokes | 264/59 |
| 3,907,949 | 9/1975 | Carlson | 264/59 |
| 4,975,225 | 12/1990 | Vivaldi et al. | 264/28 |
| 5,051,324 | 9/1991 | Bones et al. | 429/193 |
| 5,061,580 | 10/1991 | Wedlake et al. | 429/103 |

FOREIGN PATENT DOCUMENTS

| | | |
|---|---|---|
| 0038010 | 10/1981 | European Pat. Off. . |
| 2301350 | 9/1976 | France . |
| 892795 | 3/1962 | United Kingdom . |
| 1110965 | 4/1968 | United Kingdom . |
| 1219472 | 1/1971 | United Kingdom . |
| 1246012 | 9/1971 | United Kingdom . |
| 1360340 | 7/1974 | United Kingdom . |
| 1370285 | 10/1974 | United Kingdom . |
| 1408998 | 10/1975 | United Kingdom . |
| 2089711 | 6/1982 | United Kingdom . |

OTHER PUBLICATIONS

International Search Report, dated Jan. 15, 1992, based on corresponding British Patent Application No. 9209526.4.

International Search Report, dated Jun. 12, 1992, based on corresponding British Patent Application No. 9209526.4.

*Primary Examiner*—James Derrington
*Attorney, Agent, or Firm*—Arnold, White & Durkee

[57] ABSTRACT

The invention involves a method of making a holder of solid ceramic material by locating a core in a mass of particulate ceramic material, consolidating the particulate material around the core, removing the core from the particulate material to leave a green artifact having a cavity, and sintering the green artifact. The core is shaped and the particulate material is arranged such that the core is in the form of a thin slab between a pair of layers of the particulate material. After sintering, the cavity comprises a thin gap between opposed plates of sintered ceramic material. The slab has openings therethrough which are filled with the particulate material, which, after sintering, forms a bridge across the gap, between the associated plates and sintered thereto.

9 Claims, 7 Drawing Sheets

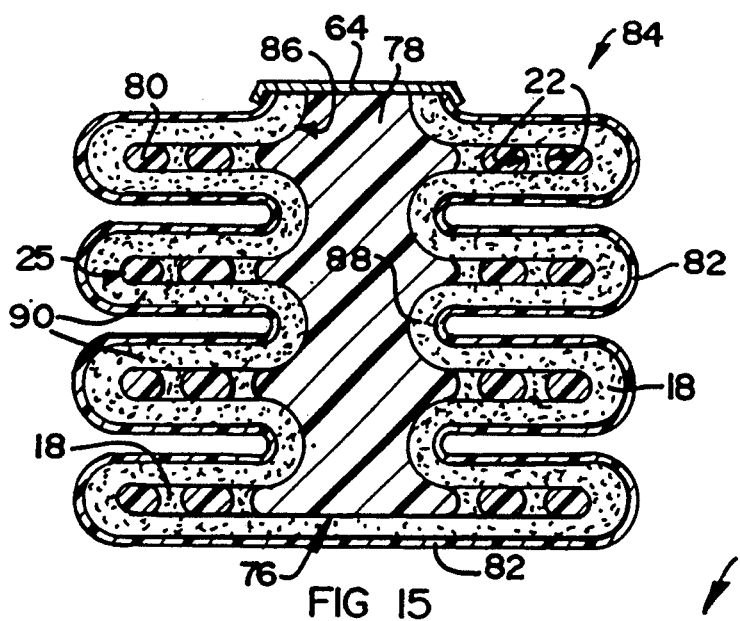
FIG 15
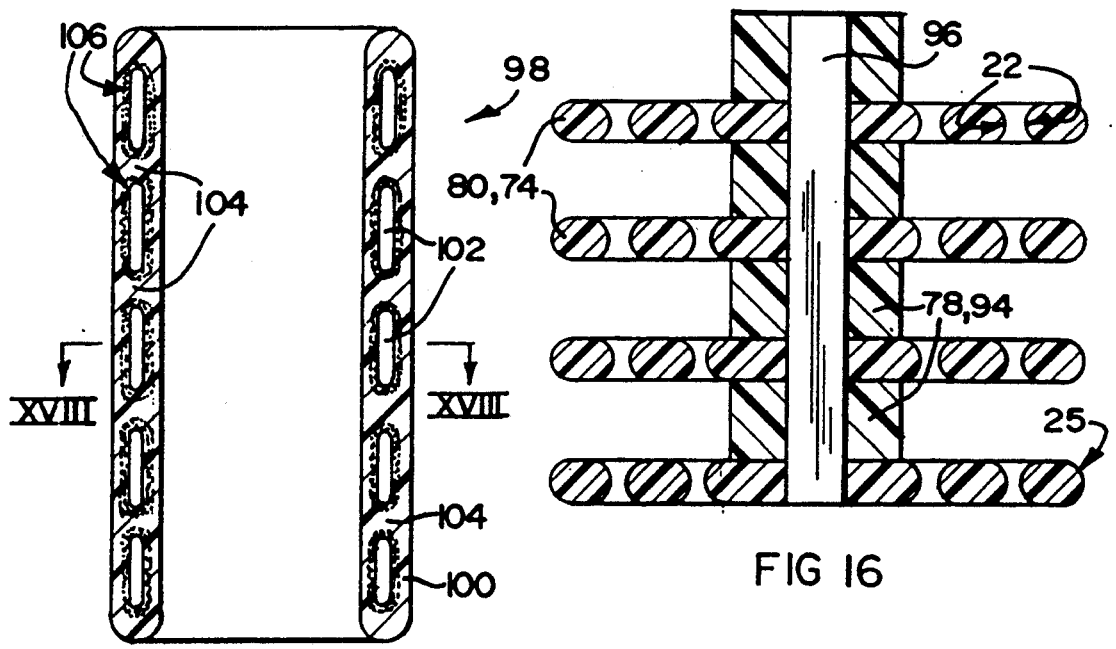
FIG 17
FIG 16
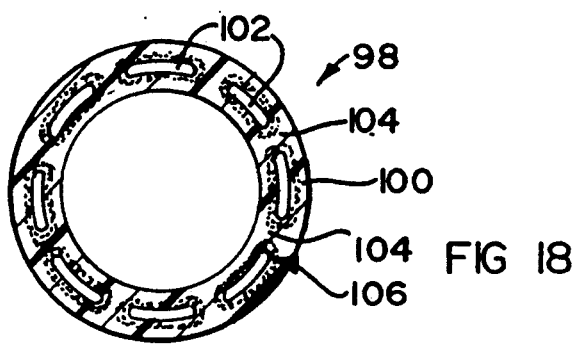
FIG 18

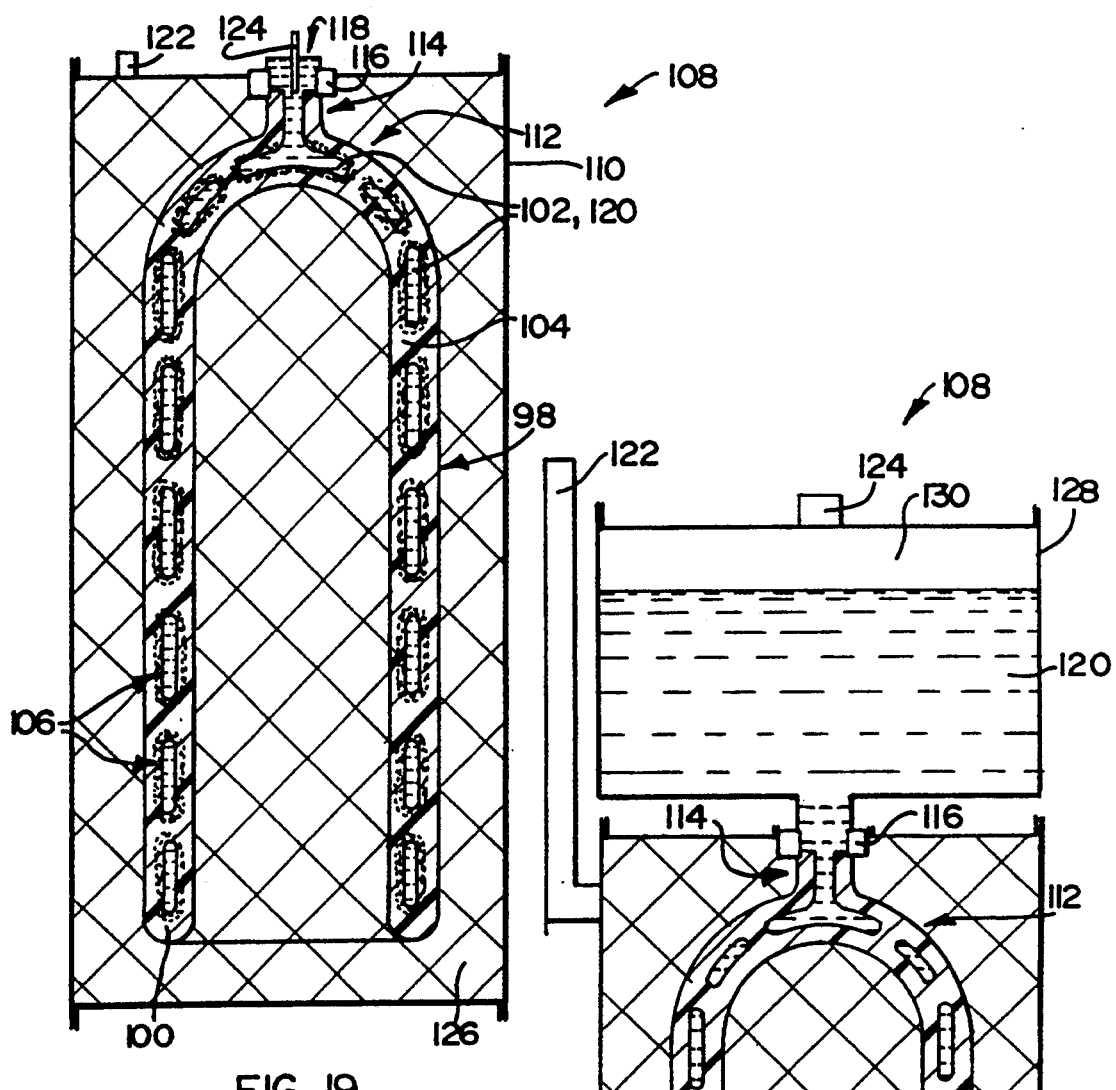
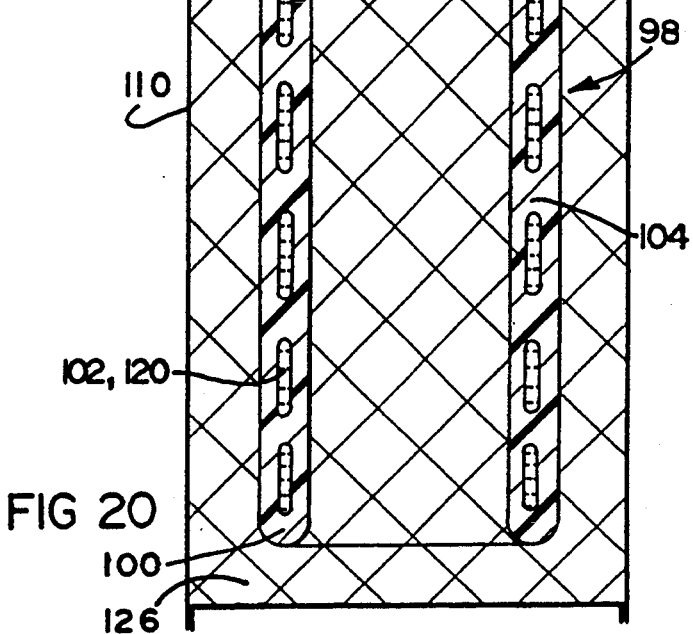
FIG 19
FIG 20

METHOD OF MAKING A HOLDER OF CERAMIC MATERIAL

This invention relates to a method of making a holder of ceramic material. More particularly it relates to a method suitable for making a holder of ceramic solid electrolyte material for holding active electrode material in a high temperature rechargeable electrochemical power storage cell; and to a holder when made in accordance with the method.

According to the invention there is provided a method of making a holder of solid ceramic material, the method comprising the steps of:

locating at least one core in a mass of particulate ceramic material or particulate precursor thereof;

compressing and consolidating the particulate material around each core so that the core is at least partially embedded therein;

removing each core from the consolidated mass of particulate material to leave a green artifact having a cavity therein; and sintering the green artifact to produce a sintered unitary artifact of ceramic material having at least one cavity therein for containing the eventual contents of the holder, each core being shaped and the particulate material being arranged such that at least part of each core is in the form of a thin slab or layer sandwiched between a pair of layers of the particulate material so that, after the sintering, at least part of each cavity is in the form of a thin gap between opposed plates of sintered ceramic material, each slab or layer having at least one opening therethrough which is filled with the particulate material, the particulate material in each opening, after consolidation thereof in the gap by the compressing and after the sintering, forming a bridge across the gap between the associated plates and sintered thereto, the bridge being capable of acting as a strut or tie between the associated plates, for reinforcing the holder.

By a thin gap is meant a gap thickness of at most 10 mm, eg 0,2–6 mm, typically 1–5 mm.

By 'precursors' with reference to the particulate ceramic material, are meant particulate substances or mixtures which, when heated during the sintering step, are transformed or converted into the ceramic material of the holder. The particulate ceramic materials or precursors thereof conveniently have a particle size of 10–200 $\mu$m, and for isostatic pressing an average particle size of 20–50 $\mu$m is preferred, while for die or uniaxial pressing an average particle size of 50–100 $\mu$m is preferred.

Each slab or layer may have a plurality of openings therethrough, the openings being spaced from one another so that, after the sintering, the plates are joined together by a matrix of said bridges, spaced from one another. Each opening may be shaped so that the bridges are in the form of short columns or pillars, evenly spaced from one another and distributed over the full extent of the gap. Preferably, each core comprises at least one unitary slab, each opening being shaped so that it is in the form of a passage whose walls are radially inwardly convexly curved in sectional side elevation, each passage having a pair of entrances respectively at opposite ends thereof, and each entrance being countersunk so that it tapers axially inwardly into the passage, each slab having a peripheral edge which is convexly curved and rounded. This will provide columns or pillars of consolidated material, and eventual sintered ties or struts, of more or less hourglass shape with rounded edges where they join the layers or plates. These rounded edges, with the rounded peripheral edge of the slab, can resist cracking of the sintered artifact if it is stressed.

The ceramic material may be solid electrolyte material for holding active electrode material in a high temperature electrochemical power storage cell, each core being entirely surrounded by the particulate material so that, after the compressing, it is fully embedded in the consolidated particulate material, and so that the sintering results in an artifact having a closed cavity therein and the method including forming a loading opening into the cavity from the exterior of the holder after the sintering.

In this case the cavity in the artifact can be kept closed, until it is to be charged with active electrode material. Accordingly, a suitable charging or loading opening for active electrode material can, if required, be machined into the cavity immediately before loading with active electrode material. This keeps the surface of the artifact exposed to the cavity in a clean, pure state, and leads to enhanced shelf-life of the artifact. This can be important when the active electrode material is a molten alkali metal such as sodium. Naturally, instead, the core can have a projection which projects through the particulate material and which, when the core is removed, leaves a feedthrough or loading opening, and in this case, during removal of the core by heating, molten core material can run out of this opening just above its melting point of eg about 50° C., instead of having to permeate through the particulate material, which is does when the cavity is kept closed.

When required to hold solid electrolyte material, the holder is typically pressed to have a compressed or flattened shape, so that it is, for example, a laterally flattened envelope with a pair of oppositely outwardly facing major faces, joined together at their edges, at least one said cavity being close to at least one said major face of the holder.

Compressing and consolidating the particulate material may be by isostatic pressing or uniaxial (die) pressing, or uniaxial pressing followed by isostatic pressing, after locating the core in the mass of particulate material in the interior of a mould. Presses are available which can carry out a uniaxial pressing step, followed by an almost simultaneous isostatic pressing step. The consolidation leads to the production of a green artifact surrounding the core, which should be of sufficient strength to remain intact during the subsequent core removal and sintering. The pressing can be carried out at temperatures from below ambient up to elevated temperatures of eg 35°–500° C., and at pressures of 30–310 MPa, preferably 30–150 MPa. To obtain good green densities and green strengths in the green artifact, the method may include admixing a suitable binder into the particulate material before the core is located therein. This binder can act as a lubricant to lubricate the pressing, and suitable binders include, for example, polymers or waxes which may be soluble in aqueous or organic solvents, such polymers or waxes including polyvinyl butyrate, polyvinyl acetate, polyvinyl alcohol, polyethylene glycol, polyethylene oxide, and other polymers, waxes and binders known in the art. These binders may form from 0,5–30% by mass of the mixture of binder and said electrolyte/precursor, conveniently 0,5–15%.

In a particular embodiment of the invention the compressing may be carried out at a temperature between −20° C. and +500° C. and at a pressure of 30–310 MPa, the method including the step of admixing 0,5–30% by mass of an organic binder with the particulate material prior to locating each core therein, and the sintering acting to drive off the binder.

Usually the core will be removed by heating in air. Accordingly, the core may be formed from a fugitive or sacrificial material which can be melted, sublimed (optionally under vacuum), vaporized and or burnt/oxidized away to remove it, for example by the initial phase of the heating used to sinter the green artifact. Cores will be used which are made to have a shape which provides the cavity with a desired shape, and can naturally be shaped to provide an opening or inlet/outlet communicating with the cavity from the exterior of the holder. Said fugitive materials include the binders mentioned above, and also carbon or graphite foils, sheets, slabs or blocks, ashless paper, naphthalene, waxes or the like, and, in particular, ice can be used as the fugitive material, in which case it is preferred to remove the core by subliming it, although it can naturally be melted/vaporized, if desired. In a particular embodiment, the core may be a mixture of a fugitive material and a sinterable ceramic or its precursor, for example the ceramic solid electrolyte itself or its precursor. In this way the cavity can be provided with a porous, liquid-permeable interior, for enhanced strength of the sintered artifact.

Conveniently, when a core is used which is recoverable by subliming under vacuum and condensing for re-use, the binder is of the same material as the core. However, if the core material is dissimilar to the binder, it can be preferable to remove the core material first, to leave the binder in place to provide a stronger green artifact for sintering, eg when ice is sublimed to leave a higher-melting binder in place.

When the ceramic artifact has a flattened shape and the core is a slab, the compressing and consolidating of the particulate material may be by uniaxial pressing or die pressing in a metal die. However, if a more complex ceramic artifact is required, eg in the form of a hollow pillar having a plurality of hollow flattened envelopes spaced along its length and in communication with its interior isostatic pressing by means of a flexible bag or sheath is preferably employed for the compressing and consolidating. In this case a core in the form of a pillar can be employed, having a plurality of disc-like circumferentially extending, radially outwardly projecting longitudinally spaced slabs in the form of flanges or fins projecting therefrom. The particulate material can then be packed around the core in the sheath prior to isostatic pressing. The consolidated material can, if desired, be machined prior to sintering to give it the required external shape, and/or a profiled sheath can be used, having circumferentially extending corrugations registering with the fins or flanges of the core. The core can be integral and solid, being formed eg by casting, or it can be composite in nature being formed from a stack of annular discs spaced apart by annular spacers having a smaller diameter than the discs. These can be threaded alternately on to an eg metal rod which can be removed after the pressing, when the wax is removed. The discs will form the fins or ribs and the spacers will form the pillar. In each case the fins may have openings therethrough, for receiving particulate material from the struts or ties after sintering, preferably of the hourglass section described above.

In a further embodiment of the invention, the core may be hollow-cylindrical in shape, having radial said openings therethrough for the ties or struts. In this case the pressing may again be by isostatic pressing using a flexible sheath or bag, eg of latex, the core being located around a mandrel and spaced radially outwardly therefrom, the particulate material being packed between the mandrel and core on the one hand, and between the core and sheath on the other, the sheath being spaced radially outwardly from the core.

When the holder is intended in use for connection to a reservoir of active electrode material, eg a reservoir of molten sodium, a single cavity can be formed therein which is thin and of low volume, ie a thin gap as described above, close to at least one surface of the holder. However, when the holder is not intended for connection to a reservoir of anode material, it may, in addition, have such reservoir formed therein by a further cavity, which can be of more substantial volume.

Accordingly, the method may employ eg two or usually three cores embedded in the particulate material, to provide two or three cavities in the sintered artifact, one of which will be a thicker core intended to provide the reservoir, the other core or cores being thinner and intended to provide an electrode space near the surface of the artifact for enhanced ion conduction. Two cores will be used when the artifact is intended to contain a reservoir of active electrode material and is intended for use in an electrochemical cell wherein the artifact is located on one side of the other active electrode material of the cell. When the artifact is intended to contain a reservoir of said active electrode material and is intended for use in an electrochemical cell sandwiched between two electrode portions of the other active electrode material of the cell, three cores will be employed. When three cores are employed, a thicker core will be a central core, and two smaller thinner cores will be arranged on opposite sides thereof.

Accordingly, there may be two opposed cores in the form of slabs, spaced apart face-to-face by a layer of the particulate material, the cores being respectively of different thicknesses. Instead, there may be three opposed cores in the form of slabs, spaced apart face-to-face respectively by two layers of the particulate material, there being a central core located between and spaced from two outer cores, the central core being thicker than the outer cores.

Thus, when the artifact has a flattened shape, the cores may be flat and arranged spaced face-to-face in a die with flat layers of the particulate material therebetween; and when the artifact is a hollow cylinder, the cores may be arranged in concentric spaced relationship between a central mandrel and an outer sheath, again with layers of particulate material therebetween. The cores may further be spaced apart by spacers of core material, the spacers being removed together with the cores from the consolidated mass of particulate material, to leave ducts for communication and liquid flow between the cavities left by the cores.

Thus, when the cores are located in the particulate ceramic material, the thicker core may be spaced by at least one spacer of core material from each other core, each spacer leaving, after the sintering, a duct in the artifact whereby the cavity left by the thicker core is placed in communication with each other cavity.

At least one said core may be provided, at least at its surface and embedded in the core material, with particles of a wicking material or its precursor, so that the sintering provides, at least on the inner surface of the cavity left by said core, porous wicking material for wicking, in liquid form, the eventual contents of the holder.

Thus, when there is a single core, it can be formed with a surface layer containing, embedded in the core material, particles of wicking material or its precursor. After removal of the core material this layer provides a porous wall surface for the cavity left by the core, into which active electrode material such as molten sodium can wick by capillary action. When there are several spaced cores, each smaller core can contain such particles of wicking material throughout its volume, so that the cavity left by removal of such smaller core is filled with porous wicking material.

As indicated above, an important application of the sintered ceramic artifacts made by the method is expected to be as electrode holders in high temperature rechargeable electrochemical cells, usually molten alkali metal anode holders. In this case the solid electrolyte material used, or its precursor, will be selected to provide a ceramic artifact which is a conductor of ions of the alkali metal in question. For cells of the sodium/sulphur type or those with molten sodium anodes and cathodes which comprise transition metal halide active cathode materials dispersed in a matrix of electronically conductive material which is porous and permeable and impregnated with alkali metal haloaluminate molten salt electrolyte, the said electrolyte material of the artifact may thus be nasicon, $\beta$-alumina or preferably $\beta''$-alumina.

Suitable ceramic solid electrolytes can also include analogues of $\beta$- or $\beta''$-alumina wherein the sodium ions of $\beta$- or $\beta''$-alumina are at least partially substituted by other metal ions, so that such ceramics are conductors of such other metal ions (for cells wherein the anodes are such other metals).

When the holder is of solid electrolyte ceramic material, it will typically be used in a high temperature rechargeable electrochemical power storage cell comprising a pair of electrodes, namely an anode and a cathode, and the holder, one of said electrodes being held in the holder, and the wall or walls of the holder acting as a solid electrolyte separator between the anode and the cathode, said solid electrolyte separator being a conductor of ions of the active anode material of the cell.

Furthermore, such solid electrolyte holder, when it holds said electrode material of a cell, can provide an electrode structure for a cell, eg an anode structure.

Conveniently the electrode held by the holder is the anode, the active anode material typically being a metal, such as an alkali metal, for example sodium (when the ceramic solid electrolyte material is nasicon, $\beta$- alumina or $\beta''$-alumina).

The invention extends to a holder of ceramic solid electrolyte material, whenever made according to the method described above.

The invention will now be described, by way of example, with reference to the following illustrative Example and diagrammatic drawings, in which:

BRIEF DESCRIPTION OF THE DRAWINGS

FIG. 15 shows a sectional side elevation of a further holder in accordance with the invention, during isostatic pressing thereof into a green artifact around the core of FIG. 14;

FIG. 16 shows a sectional side elevation of a variation of the core of FIG. 14;

FIG. 17 shows a sectional side elevation of a hollow cylindrical holder according to the invention;

FIG. 18 shows a section along line XVIII—XVIII in FIG. 17;

FIG. 19 shows a schematic sectional side elevation of a high temperature electrochemical cell employing a holder according to the invention; and FIG. 20 shows a view similar to FIG. 19 of another similar cell employing a holder according to the invention.

In FIG. 1 of the drawings, reference numeral 10 generally designates a mould and die arrangement, during the uniaxial pressing of a holder in the form of a compressed, laterally flattened envelope in accordance with the method of the invention. The arrangement 10 comprises a mould or die body 12, a movable die plunger 14 and a movable die plunger 16.

In the interior of the mould body is shown a mass of particulate $\beta''$-alumina particles 18 of an average particle size of 50–100 $\mu$m, admixed with 15% by mass of water soluble wax, namely polyethylene glycol. Embedded in the mass of particles 18 is a core 20, which is a casting or moulding of polyethylene glycol (see also FIG. 2 in which this core is designated 20).

Figure 2:
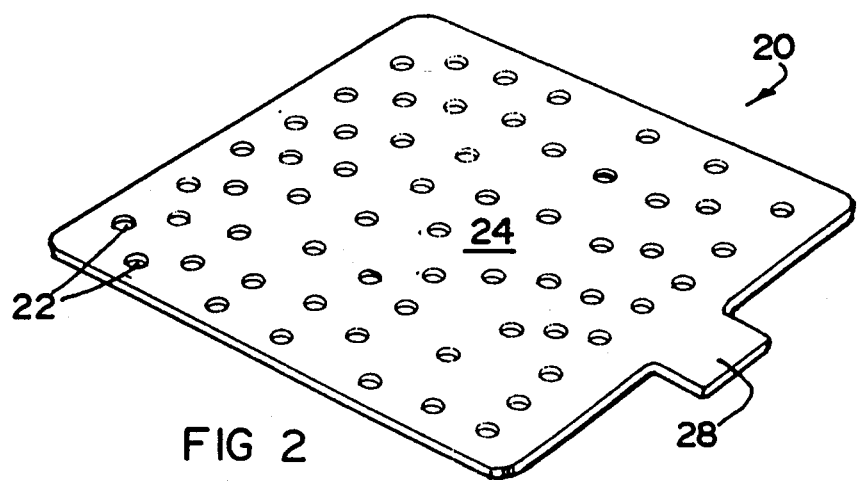
FIG. 2 shows a schematic three-dimensional view of a core for use with the mould of FIG. 1.

Referring also to FIG. 2, the core 20, which is in the form of a flat rectangular slab or plate, has a plurality of tubular openings 22 therethrough, evenly distributed in spaced relationship, over its full area and interconnecting its major faces 24.

Figure 1:
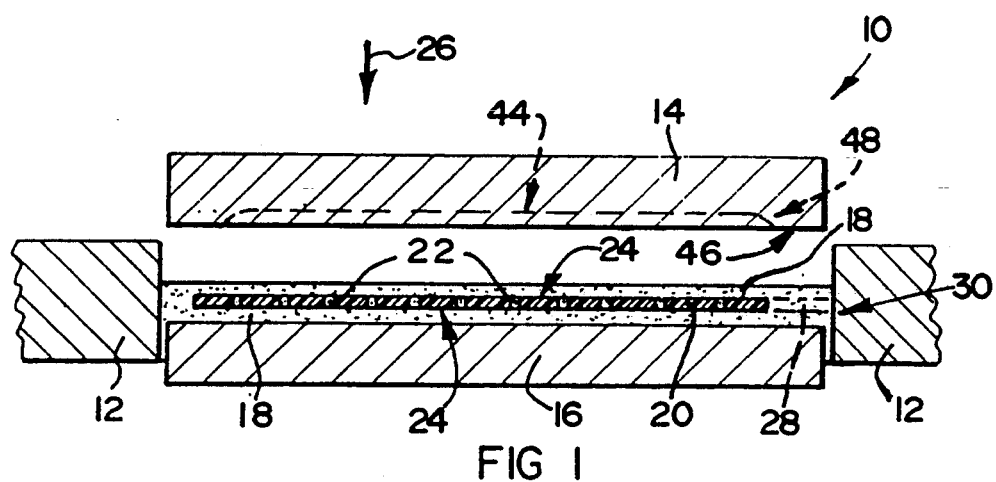
FIG. 1 shows a schematic sectional side elevation of a green holder being made according to the method of the present invention, during uniaxial pressing thereof into a green artifact by means of a die while located in a mould.

In accordance with the method of the invention, the arrangement 10 is set up with the plunger 14 retracted and the plunger 16 in place, as shown in FIG. 1. A particulate mixture of said β-alumina particles 18 and wax, premixed as described hereunder, is charged into the mould interior, and a pre-formed core 20 is embedded in the mixture 18 as shown. This is done by charging a more or less flat layer comprising about half the mixture 18 into the mould interior, placing the core 20 on said layer, and charging the remainder of said mixture 18 into the interior on top of the core 20, as a second flat layer, which also fills the perforations 22 and the peripheral spaces between the core 20 and the walls of the mould or die body 12. The plunger 14 is then urged uniaxially in the direction of arrow 26 towards the plunger 16 which acts as an anvil, to compress the mixture 18 around the core 20 and in the passages 22. The plunger 14 is then retracted in the opposite direction and the green artifact 30 produced, containing the core 20, is removed from the mould 12.

The green artifact is then heated in air, inert gas or under vacuum to remove the polyethylene glycol at a temperature of up to 500° C., eg 400° C. The green artifact is then heated further, first to evaporate any free water or surface—or chemically bound water in the mixture, and secondly to sinter the $\beta''$-alumina particles together, to form a continuous, unitary sintered polycrystalline $\beta''$-alumina artifact.

This artifact is an envelope of flattened shape and has a flattened interior cavity in the form of a gap vacated by the core 20, the $\beta''$-alumina in the perforations 22 being sintered into pillars integral with, and strengthening and spacing apart, the major faces of the envelope formed from the layers of mixture 18 on opposite sides of the core 20 in the mould 12. These major faces are bound together at the periphery of the envelope by mixture 18 charged into the peripheral spaces between the edges of the core 20 and the mould 12.

In this regard it will be noted that the core 20 (FIG. 2) has an outwardly projection in the form of a tab or ear 28, midway along one of its side edges. The core is loaded into the mould 12 so that the ear 28 touches the mould wall at 30 (FIG. 1). After the core removal and sintering, the ear 28 leaves a space which forms a feedthrough or loading opening from the exterior of the envelope through said side edge thereof, into the interior cavity of the envelope vacated by the core 20.

Figure 3:
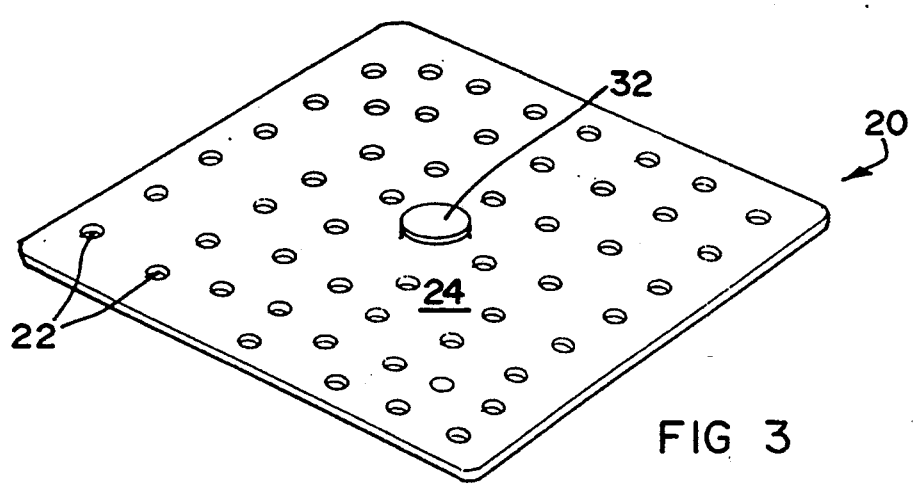
FIG. 3 shows a view similar to FIG. 2 of another core for use with the mould of FIG. 1.

In contrast, in FIG. 3, the ear 28 is omitted and is replaced by a pair of truncated cylindrical bosses 32, respectively in central positions on opposite sides of the core on its major faces and one of which is visible in FIG. 3. The core of FIG. 3 is located in the mould in a fashion such that there is no mixed material 18 between the bosses 32 and the plunger 14 and anvil 16 respectively. After the core removal and sintering, the spaces vacated by these bosses provide the envelope with a pair of central opposed openings through the major faces of the walls of the envelope.

Figure 4:
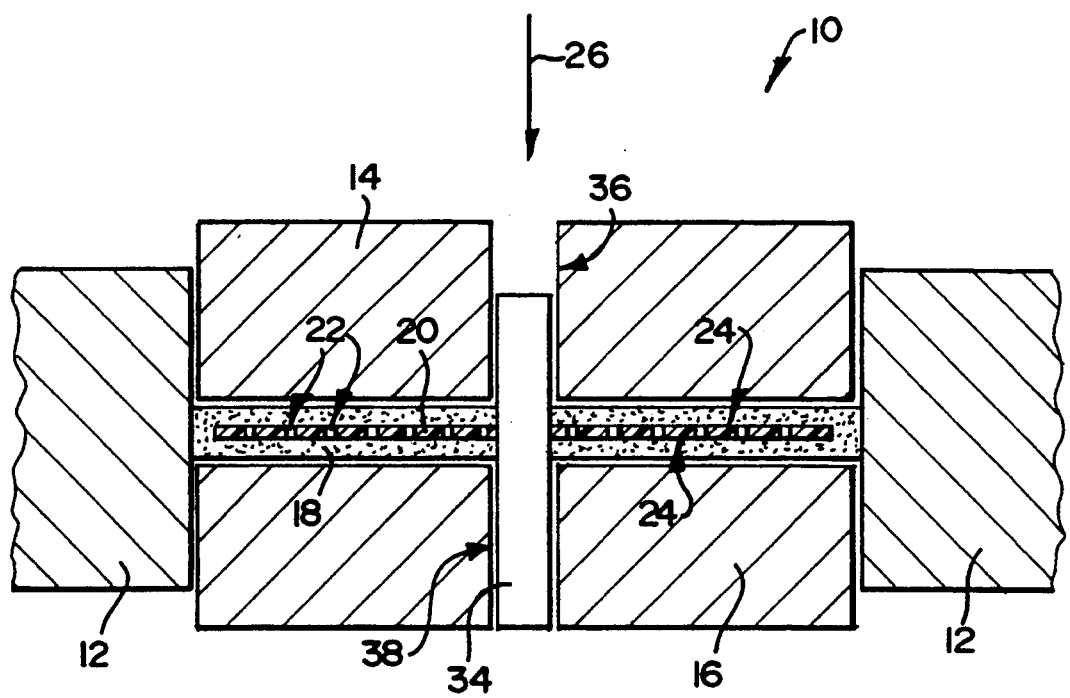
FIG. 4 shows a view similar to that of FIG. 1, of another holder according to the invention, during uniaxial pressing thereof into green artifact by means of a die located in a mould.

In FIG. 4, the same reference numeral designate the same parts as in FIG. 1, unless otherwise specified. The arrangement shown in FIG. 4 is for making an envelope or holder similar to that for which the core 20 of FIG. 3 is intended. However, in the case of FIG. 4, the bosses 32 of the core 20 of FIG. 3 are omitted, and a rod 34 is employed, the plungers 14, 16 having central openings or passages 36, 38 respectively, in which the rod 34 is located. The rod 32, similarly to the bosses 32 of FIG. 3, provides the envelope with central opposed openings through the major faces of the walls of the envelope.

Figure 5:
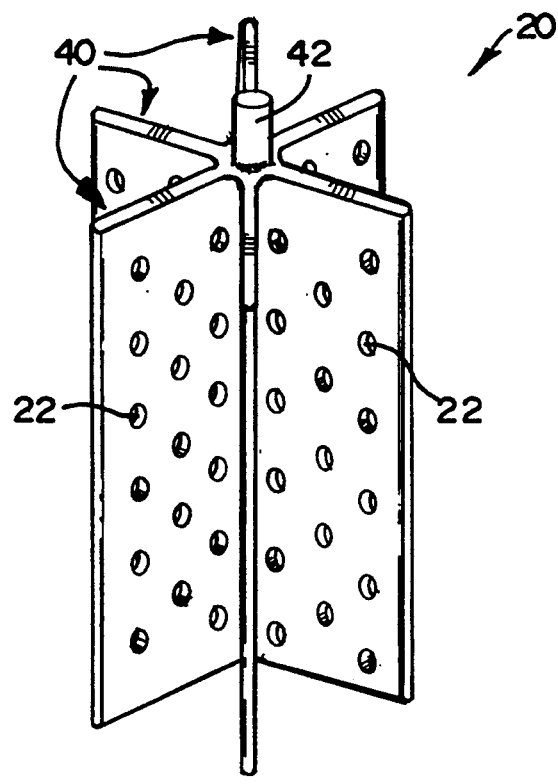
FIGS. 5-8 show schematic three-dimensional views of cores for use in the isostatic pressing of holders according to the invention.
Figure 6:
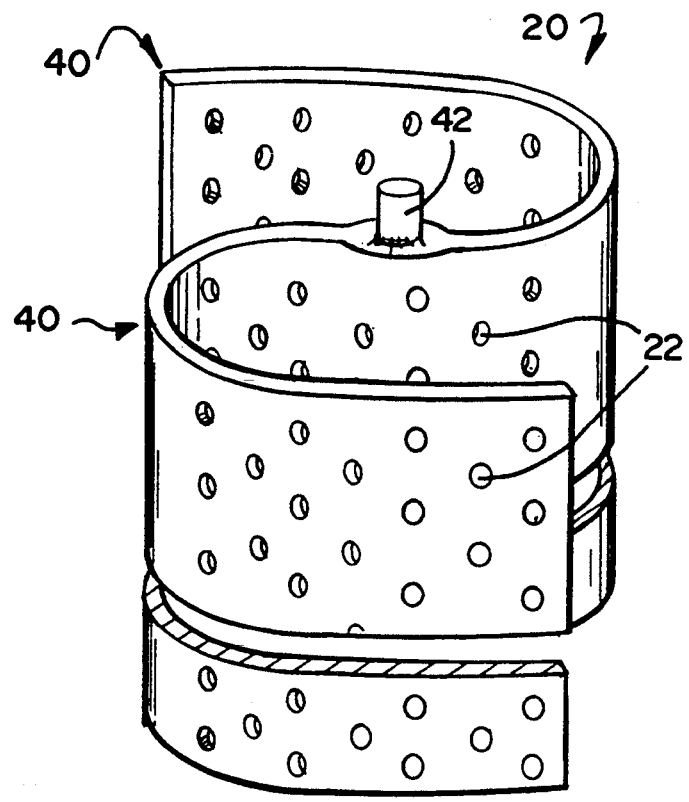
Figure 7:
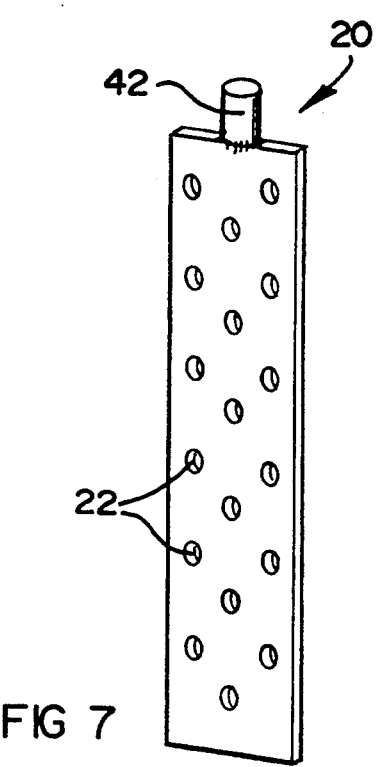

FIGS. 5–8 show various cores 20, for use in the isostatic pressing of holders or envelopes which, except for that of FIG. 7 (which can also be made by uniaxial or die pressing), are of somewhat more complex shapes. Thus, in FIG. 5 the core 20 is star-shaped in cross-section having a plurality of equally circumferentially spaced outwardly radiating limbs 40 in the form of slabs, each of which has perforations 22 similar to those of FIGS. 1–4. During pressing of the corresponding holder or envelope, this core will be embedded in a latex bag (not shown) having an interior of similar shape and cross-section to the shape and cross-section of the core 20, so that the mass of particles (18 in FIG. 1) forms a layer of more or less uniform thickness between the core 20 and latex bag. The particles will occupy the perforations 22 and the core has a cylindrical central projection 42 at one end thereof, to form an opening, at one end thereof, into the hollow interior of the eventual holder or envelope.

The core 20 of FIG. 6 is broadly similar to that of FIG. 5, and the same reference numerals refer to the same parts, the major difference being that there are only two limbs 40 which are each U-shaped, in cross-section, so that the holder will be roughly S- or Z-shaped in cross-section.

Figure 8:
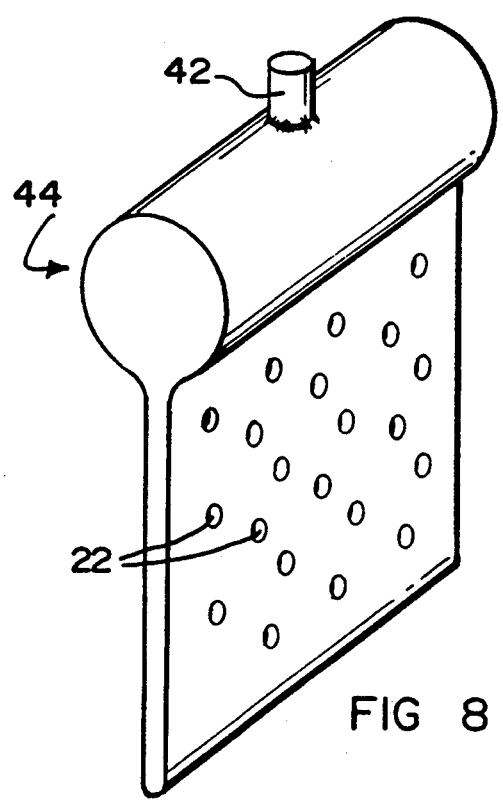

In FIG. 7 a core 20 is shown, similar to the core 20 of FIG. 2, except that a cylindrical projection 42 replaces the tab or ear 28 of FIG. 2. FIG. 8 in turn shows a modified version of the core of FIG. 7, the core 20 of FIG. 8 being relatively broader and shorter and having a cylindrical expanded portion 44 at one end thereof, free of perforations 22, and intended in use to form an expanded part of the interior of the holder, to act as an upper reservoir in the holder or envelope for active electrode material, the projection 42 projecting longitudinally out of the portion 44.

Naturally, as with the core of FIG. 5, the cores of FIGS. 6 to 8 will be used with suitably complementarily shaped latex bags, for the isostatic pressing of a mass of particles, the mass of particles in each case being arranged as a layer between the core and latex bag in question, to form the envelope or holder. Other shapes for holders can naturally be made in similar fashion, as desired.

As a variation of the method described above, it should be noted that no special provision (such as the ear 28 of FIGS. 1 and 2, the bosses 32 of FIG. 3 or the rod 34 of FIG. 4) need be made for openings into the envelope, prior to sintering. In principle the evaporation or sublimation can take place without any opening into the interior of the envelope, as the wax core 20 can diffuse out through the walls of the envelope before they densify on sintering. The opening(s) into the interior of the envelope can be made where desired after sintering, eg by machining.

A further variation of the method involves the use of profiled faces on at least one of the plungers 14, 16, eg as shown at 44 on the upper plunger 14 in FIG. 1. The face in question is recessed inwardly from a peripheral strip 46 by a shallow step at 48. This feature leads to enhanced densification along the periphery of the green envelope, and of the final envelope after sintering, the degree of densification increase depending on the compressibility of the core 20 and mixture 18.

A still further variation of the method involves the use of plungers whose pressing faces have been coated with a layer of flexible material, eg polyurethane. This assists with uniform pressure applications across the entire face of the envelope.

In this regard it should be noted that, in use, the envelopes are intended to hold molten sodium anode material in a high temperature electrochemical power storage cells of the general type described hereunder, and the openings provided by the ear 28 or bosses 32 are intended as inlets/outlets for placing the interior cavity of the envelope in communication with reservoirs of molten sodium, and/or with other similar envelopes containing molten sodium.

Figure 9:
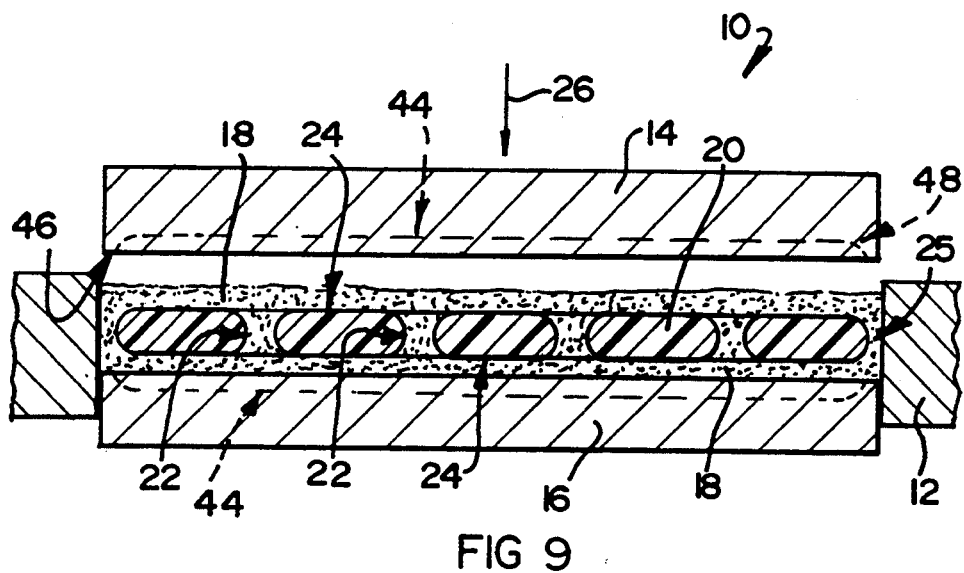
FIG. 9 shows a schematic sectional side elevation of another green holder being made in accordance with the method of the present invention, during uniaxial pressing thereof into a green artifact by means of a die, while located in a mould.

In FIG. 9 of the drawings, similarly to FIG. 1, reference numeral 10 generally designates a mould and die arrangement, during uniaxial pressing of a holder in the form of a compressed, laterally flattened envelope in accordance with the method of the invention. The arrangement comprises a mould or die body 12, and a pair of movable die plungers 14, 16. Unless otherwise specified, the same reference numerals are used in FIG. 9 as in FIG. 1.

Thus, in the interior of the mould 12 is again shown a mass of particulate $\beta''$-alumina particles 18 of a particle size of 10–100 μm, admixed with 15% by mass thereof of polyethylene glycol. Embedded in the particles 18 is a core 20, which is a casting of polyethylene glycol (see also FIG. 10 where a similar core is also designated 20).

The core 20 of FIG. 9 is in the form of a flat slab or plate of rectangular outline, having a plurality of openings 22 therethrough which are evenly spaced from one another and are spread across its full extent. Each opening 22 interconnects the major faces 24 of the core 20 and is a passage of roughly hourglass shape in sectional side elevation, as viewed in FIG. 9, having walls which bulge convexly inwardly so that it has a narrow waist portion into which lead entrances at opposite ends of the passage. The entrances are countersunk and taper inwardly, being convexly curved in sectional side elevation. The peripheral edges 24 of the core 20 are rounded and convexly curved, being similar in sectional side elevation to the walls of the passages 22.

In accordance with the method of the invention, the arrangement 10 is set up with the plunger 14 retracted and the plunger 16 in place, as shown in FIG. 9. A particulate mixture of said particles 18 mixed with wax, is charged into the mould interior and the core 20 is embedded in the mixture as shown. This is done by charging a more or less flat layer comprising about half the particles 18 into the mould interior, placing the core 20 on said layer, and charging the rest of the particles 18 into the mould on top of the core 20, as a second flat layer, the particles 18 also filling the passages 22 and the peripheral spaces between the peripheral edges 24 of the core 20 and the interior walls of the mould 12. The plunger 14 is then urged uniaxially in the direction of arrow 26 into the mould 12 towards the plunger 16, to compress and consolidate the particles 18 around the core 20 and in the passages 22 to produce a green artifact from the particles 18. The plunger 14 is then retracted in the opposite direction, and the green artifact, containing the core 20, is removed from the mould 12.

The green artifact is then heated in air at atmospheric pressure or under a suitable vacuum to evaporate off the polyethylene glycol of the core 20, and in the mixture with consolidated particles 18, at a temperature of up to 550° C., eg 400° C. The artifact is then heated further, first to evaporate water (free water or surface- or chemically bound water) from the artifact, and secondly to sinter the $\beta''$-alumina particles 18 together to form a continuous, unitary polycrystalline $\beta''$-alumina artifact.

This artifact is a hollow envelope of flattened shape and has a flattened single continuous interior cavity, in the form of a gap vacated by the core 20 between sintered plates of sintered material formed by the major faces of the envelope. The particles 18 in the passages 22 are sintered into ties or struts integral with, and reinforcing and spacing apart, the major faces of the envelope which are plates formed from the layers of particles 18 on opposite sides of the core 20 in the mould 12.

With regard to the hourglass shape of the ties or struts arising from the shape of the passages 22, whereby they have rounded edges where they join said major faces, and with regard to the rounded peripheral edges of the envelope (caused by the edge 24 of the core 20), it will be appreciated that these, when compared with sharp edges (see FIG. 1), tend to resist cracking of the sintered artifact. Such cracking can be caused by thermal stresses and by stresses arising from pressure changes across the walls of the envelope. It should further be noted that in fact no opening into the green artifact is necessary to permit the evaporating polyethylene glycol to escape. It can in fact diffuse through the walls of the green artifact, which are sufficiently porous for this purpose, although they become substantially hermetically airtight after sintering. The absence of such opening is an advantage, as the interior of the holder is protected and kept in a pure state, for enhanced shelf-life. If desired, an opening into the interior cavity of the artifact can be machined, eg by drilling, shortly before use.

If desired, the plungers 14, 16 can have profiled faces, as shown at 44. The faces are recessed inwardly from a peripheral strip 46 by a shallow step at 48. This feature leads to enhanced densification along the peripheral edge of the green envelope, and of the ceramic envelope after sintering.

Figure 10:
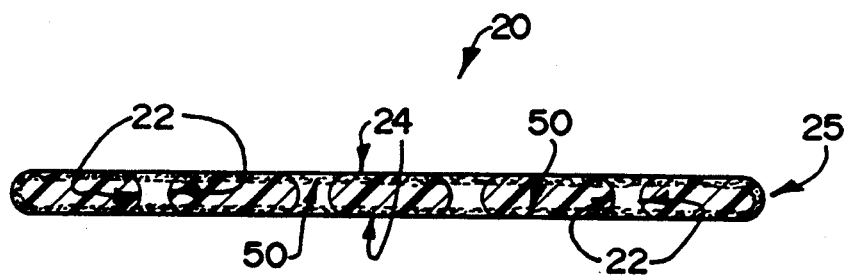
FIG. 10 shows a schematic sectional side elevation of a wax core for use in the mould shown in FIG. 9.

In FIG. 10 the core is generally designated 20 and the same reference numerals are used for the same parts thereof as in FIG. 9. The principal difference is that the core 20 of FIG. 10 has a surface layer 50 containing particles of wicking material, such as the particles 18 of $\beta''$-alumina used for the artifact, mixed with a suitable proportion of carbon balls of similar size. During the sintering the carbon is burnt off, to leave a porous sintered $\beta''$-alumina layer lining the cavity or gap of the sintered envelope. This porous lining is suitable for wicking molten sodium by capillary action during use as described hereunder, from the interior of the cavity into a layer of molten sodium coating the inner surface of the cavity.

Figure 11:
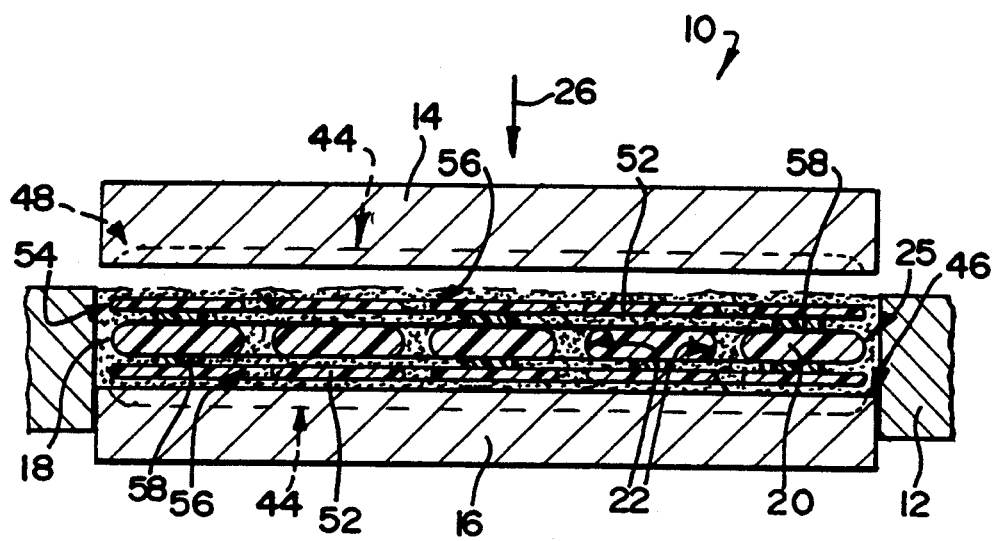
FIG. 11 shows a view similar to FIG. 9 of another green holder being made according to the method of the present invention, during uniaxial pressing thereof into a green artifact.

Turning to FIG. 11, the same reference numerals are again used for the same parts as in FIG. 9, unless otherwise specified. The assembly 10 is essentially similar to that of FIG. 9, except that three cores of the same outline are employed, namely a thicker central core, similar to that of FIG. 9 and identified by the same reference numerals as in FIG. 9, and two identical thinner cores 52 having convexly curved peripheral edges 54 and roughly hourglass shaped passages 56 therethrough.

The cores 20, 52 are spaced apart in series by layers of particles 18 as shown, and by a plurality of evenly spaced polyethylene glycol spacers 58. In the mould the lower core 52 is laid on a lower layer of particles 18, and a further layer of particles is spread on said core 52, after the spacers 58 have been placed therein, the spacers 58 having a thickness equal to this layer. The core 20 is placed on this layer, and is followed by a further layer of particles 18 with spacers 58, and then the upper core 52 and an uppermost layer of particles 18.

During consolidation in the mould 12 the spacers 58 are urged firmly against the cores 20, 52 on opposite sides thereof, and, after evaporating of the cores and spacers 58, passages are left by the spacers whereby the cavities left by the cores 20, 52 are placed in communication.

In use the holders produced by the assemblies shown in FIGS. 9 and 11 will be anode holders, containing molten sodium, in high temperature electrochemical power storage cells, which are electrochemically of the type described hereunder with reference to FIGS. 19 and 20. In such cells the holder will be located sandwiched between two cathode portions in a cell housing. In this case the holder produced by the assembly of FIG. 9 can have an opening machined therein for connection to an external reservoir of molten sodium. However, in the case of FIG. 11, the holder produced can have its central cavity, left by the core 20, act as a reservoir for molten sodium, the sodium passing into the cavities left by the cores 52, to a position close to the surface of the holder, for enhanced sodium ion transport to and from the cathode portions. Naturally, if desired, the cores 52 and spacers 58 can contain, throughout their volume, a mixture of $\beta''$-alumina particles and carbon balls, similar to that described with reference to the surface layer 50 of the core 20 of FIG. 10, so that, after sintering, the interiors of the cavities left by the cores 52 and the spaces left by the spacers 58 will be filled with porous sintered $\beta''$-alumina which has a wicking capability provided by capillary action.

Figure 12:
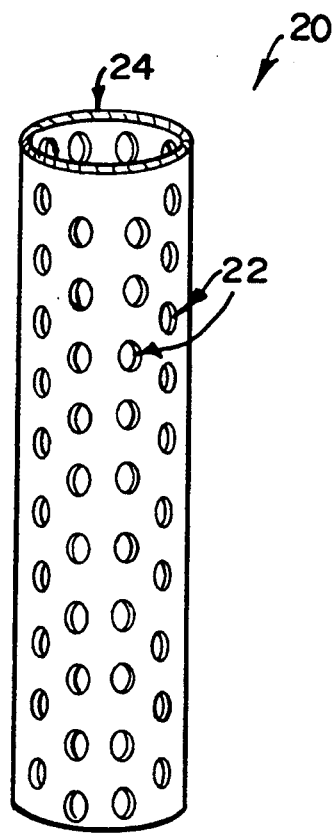
FIG. 12 shows a three dimensional view of a hollow cylindrical core for use in the method of the invention.

In FIG. 12 a core 20 is shown, generally similar to the core 20 of FIG. 9, except that the core of FIG. 12 is hollow-cylindrical in shape, the core 20 of FIG. 12 having hourglass-shaped passages 22 and rounded end edges 25 as described for the core 20 of FIG. 9.

Figure 13:
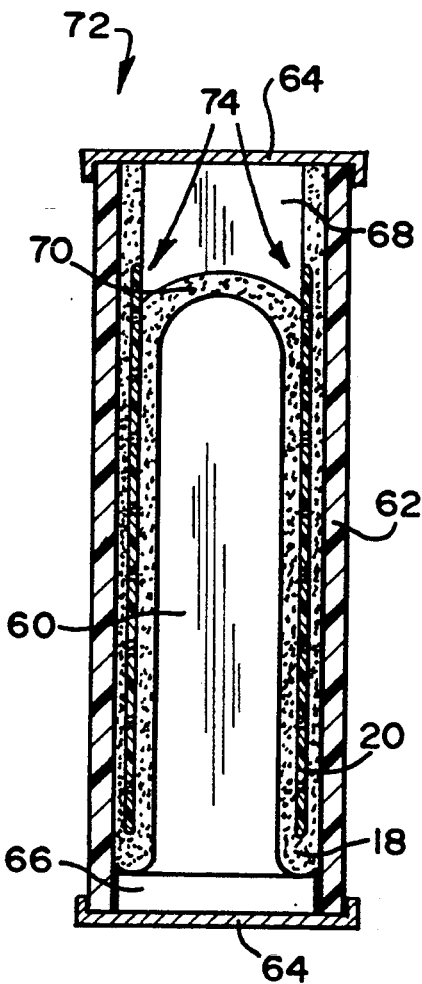
FIG. 13 shows a sectional side elevation of another holder in accordance with the invention, during isostatic pressing thereof into a green artifact.

The core 20 of FIG. 12 is shown being used in FIG. 13 to produce a hollow tubular artifact. In FIG. 13 a steel mandrel 60 is shown, located concentrically in a tubular latex sheath 62 and spaced radially therefrom. The sheath 62 is closed by steel end caps 64. The mandrel 60 has a plinth or pedestal 66 on which it rests, and is shown embedded above the plinth 66 in a mass of particles 18 which fill the sheath 62. Above the mandrel 60 a cylindrical steel or rubber plug 68 is located. The core 20 of FIG. 12 is shown, embedded in the particles 18, spaced radially between the mandrel 60 and sheath 62. The upper end of the mandrel is dome-shaped, and the lower end of the plug 68 is correspondingly concave and dished, said upper and lower ends being spaced by a curved, rounded layer 70 of particles 18. The outer diameter of the plinth 66 is a sliding fit in the sheath 62, and the outer diameter of the plug 68 is a sliding fit in the core 20. The plinth 66 rests on the lower cap 64 and the upper cap 64 rests on the top of the plug 68. The mandrel 60, sheath 62, caps 64 and plug 68 are assembled together into an arrangement, generally designated 72 in FIG. 5, whose purpose is similar to that of the arrangement 10 of FIGS. 9 and 11.

To assemble the arrangement 72 the lower cap 64 is placed on the lower end of the sheath 62, with the mandrel 68 on the lower cap 64 and inside the sheath 62. A small quantity of particles 18 is charged into the sheath 62 from above, sufficient to cover the plinth 64, as shown. The core 20 is then inserted from above into the sheath 62, to rest on these particles, spaced concentrically between the mandrel 60 and sheath 62. Further particles 18 are then charged from above, to a depth close to, but below, the upper end of the core 20, which extends above the mandrel 60, the further particles being sufficient to cover the mandrel and to provide the layer 70. The plug 68 is then inserted from above into the core 20, and pressed firmly down, with vibration if necessary, to form the rounded layer 70 with no cavities therein. The remaining interior of the sheath 62, around the core 20 and plug 68, is filled with particles 18 and the upper cap 64 placed in position.

After assembly of the arrangement 72, the method is essentially similar to that described above for FIGS. 9 and 11, except that the compressing to consolidate the particles 18 is by isostatic pressing on the outside of the sheath 62. Naturally the mandrel 60 and plug 68 will be removed from the green artifact prior to removal of the core 20 and sintering. After the sintering an artifact is produced having the shape of the space occupied by the particles 18 in FIG. 13. The artifact will be hollow-cylindrical, having in its wall a continuous cylindrical gap or cavity bridged by radially extending ties or struts (analogous to the cavity and ties in the envelope produced by the arrangement 10 of FIG. 9). The layer of particles at 70 will provide a partition across the hollow cylindrical central space of the artifact left by removal of the mandrel 60 and plug 68. The wall of the artifact above this partition will be somewhat thinner than below the partition and removal of the core at 74 will provide for communication and sodium flow between the cavity left by the core 20, and the part of the hollow cylindrical central space of the artifact left by the plug 68, which part in use acts as a reservoir for molten sodium in an electrochemical cell. The artifact will be used in a cell of the type described hereunder with reference to FIG. 20, except that, unlike FIG. 20, the sodium reservoir will be provided in the part of the artifact vacated by the plug 68, and will be inside the cell housing.

Figure 14:
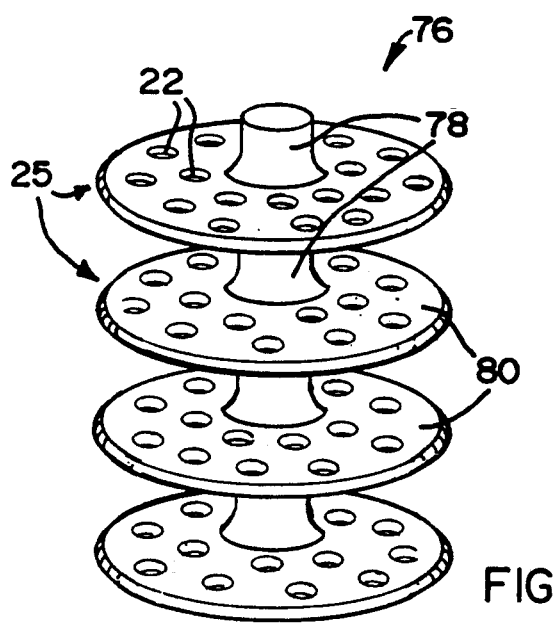
FIG. 14 shows a three dimensional view of another core for use in the method of the invention.

Turning to FIG. 14 a more complex unitary core is designated 76, comprising a pillar 78 having a plurality of disc-like circumferentially extending radially outwardly projecting fins 80 spaced along its length. The pillar 78 extends upwardly from the lowermost fin 80 and projects upwardly above the uppermost fin 80. The fins have passages 22 of the type described with reference to FIGS. 9 and 11, and rounded peripheral edges 25.

In FIG. 15 the core 76 of FIG. 14 is shown embedded in particles 18 contained in a correspondingly shaped latex bag 82 to form an arrangement 84 for compressing and consolidating a green artifact around the core 76. The bag has an open top or neck, at 86 around the top of the pillar 78, which neck 86 is closed by a cap 64. To form the arrangement 84 the core 76 is inserted into the bag 82, which is sufficiently resiliently stretchable to permit this and, with the core 76 concentrically spaced from the bag 82 and spaced above the bottom of the bag 82, the bag 82 is filled, outside the core 76, with particles 18 and closed by the cap 78 prior to isostatic pressing. The bag 82 (which is a split bag having two halves extending lengthwise) is stripped after pressing from the green artifact formed, followed by core removal and sintering as described above. This leaves a ceramic artifact holder in the form of a hollow pillar (see 88 in FIG. 15) with a plurality of hollow flattened envelopes (see 90 in FIG. 15) spaced along its length and having cavities left by the fins 80 in communication with the interior of the pillar 88 formed by the cavity left by removal of the pillar 78 of the core 76. The hollow interiors of the envelopes 90, left by the removal of the fins 80, have hourglass-shaped reinforcing ties or struts formed by the particles 18 in the passages 22.

In FIG. 16 a version of the core 76 of FIG. 6 is shown, but of composite construction, whereby the fins 80 are made up of annular discs 92 and the pillar 78 is made up of annular spacers 94. The same reference numerals designate the same parts in FIG. 16 as in FIG. 14 and the core of FIG. 16 is used in essentially the same fashion as described above, with reference to FIG. 15, for the core 76 of FIG. 14. To assemble the core 76 of FIG. 16, however, the discs 96 and spacers 94 are stacked alternately with a sliding fit on a steel rod or bar 96, which can remain in place during the compressing in the bag 82 (FIG. 15), and the bar 96 can easily be removed after removal of the core 76 and before sintering. The core 76 of FIG. 16 is used to make an artifact essentially similar to the artifact made using the core 76 of FIG. 14 as described above.

FIGS. 17 and 18 show a hollow cylindrical artifact, generally designated 98, which has been made using an arrangement similar to that shown in FIG. 13. However, to make the artifact 98, a mandrel (see 60 in FIG. 13) will be used with a flat end remote from its plinth 66, extending all the way up to the upper cap 64 (FIG. 13); and the core 20 will extend from close to the plinth 66 as shown in FIG. 13 up to a position spaced equally close to the upper cap 64. In FIG. 17 the core is shown with a cylindrical wall 100 having a cylindrical cavity 102 therein, bridged by radially extending struts or ties 104. The core 20 used will be that of FIG. 12, the ties or struts 104 being formed in the passages 22 (FIG. 12). The cavity 102 is shown with a porous lining 106, made by using a core 20 as shown in FIG. 12, but which has a surface layer (see 50 in FIG. 10) containing particles of wicking material as described with reference FIG. 10.

Turning to FIG. 19, a high temperature rechargeable electrochemical power storage cell is generally designated 108. The cell 108 has a cylindrical electrochemically conducting housing 110 in which a holder 98 made by the method of the present invention is concentrically located. The holder 98 is essentially similar to that of FIGS. 17 and 18, except that it has a domed upper end 112, having been made in an arrangement as shown in FIG. 13, except that the upper cap 64 was omitted and the sheath 62 (FIG. 13) was necked inwardly (or similarly shaped) over the domed end of the mandrel 60, to form a curved space over the mandrel for the particles 18 forming said domed end 112 of the holder 98, the sheath 62 also having an upper neck which formed a neck 114 in the holder 98. A core was used, similar to that used for FIG. 17, except that it was cast to have a domed upper end and neck portion, corresponding in shape to the cavity 102 shown in FIG. 19.

The neck 114 of the holder 98 is connected to the housing 110 by an insulating seal 116 and is closed off by a sealed closure at 118. The cavity 102 is filled with molten sodium 102. There is a cathode terminal post 122 connected to the housing 110 and an anode terminal post 124 passes via the closure 118 into the sodium 120. The holder 98 is immersed or embedded in cathode material 126 which can be sulphur/sodium sulphide/polysulphide, or it can be that of a cathode comprising transition metal halide active cathode material dispersed in a matrix of electronically conductive material which is porous and permeable and is impregnated with alkali metal haloaluminate molten salt electrolyte, the said electrolyte material of the artifact may thus be nasicon, $\beta$-alumina or preferably $\beta''$-alumina, the molten electrolyte being eg $NaAlCl_4$ in contact with some NaCl in the matrix and the active cathode material being a suitable transition metal halide such as $FeCl_2$ or $NiCl_2$.

In FIG. 20 another cell is generally designated 108, and the same parts are designated by the same reference numerals as in FIG. 19. In FIG. 20 the wicking porous lining 106 is omitted as is the closure 118. Instead, a reservoir 128 containing sodium 120 below an inert gas space 130 is connected to the neck 114.

It should be noted that, although not shown in the drawings, holders 98 can be made of the type shown in FIG. 17–20, in which there are three cavities 102, similar to the three cavities in the flattened envelope holder produced by the arrangement 10 of FIG. 11, namely a thicker central cylindrical cavity and two thinner cavities radially on opposite sides thereof, spaced therefrom, and connected thereto by spaces left by spacers whose function is the same as that of the spacers 58 of FIG. 11. These spacers and thinner cavities can be filled by porous wicking material (see 106 in FIGS. 17 and 18).

Finally, it should be noted that the holder produced by the arrangement 72 of FIG. 13 can be used in a cell in a fashion essentially similar to the way in which the holders 98 are used in the cells 108 of FIGS. 19 and 20. In this case the holder will have the part of its hollow cylindrical central space left by the plug 68 (FIG. 13) function as a sodium reservoir (see 110 in FIG. 12). This reservoir, unlike the reservoir 128 of FIG. 20, will be located inside the cell housing and can be suitably connected to the housing by a seal (see 116 in FIG. 19) and closed by a closure (see 124 in FIG. 19).

EXAMPLE

It is contemplated that, in a typical embodiment of the invention, the core 20 (see FIGS. 2 and 3) will be moulded (eg by casting or uniaxial pressing) of polyethylene glycol in one or the other of the shapes shown in FIGS. 2 and 3. Separately, a mixture will be made up of $\beta''$-alumina powder of average particle size of 50–100 $\mu$m, and polyethylene glycol. The polyethylene glycol is admixed with the $\beta''$-alumina as a solution of 30% by mass thereof in water, in a proportion amounting to 15% by mass on a dry basis of the mixture thereof with $\beta''$-alumina. This mixing is followed by spray drying to a drier outlet temperature of 130° C. to a moisture content of no more than 10% by mass.

After loading in the die, the pressing will be to a pressure of 30 MPa, to reduce the wall thickness of the envelope from 5 mm to 2 mm, the core having a thickness of 1 mm so that the pressed green artifact has an overall thickness of 5 min.

The green artifact is then heated according to the following heating regime, under atmospheric air, first to remove the polyethylene glycol, to remove water by evaporating it and debonding it from the $\beta''$-alumina, and then to sinter the artifact:

Ambient—400° C. at 25° C./hr (in air)
400°–1600° C. at 100° C./hr (in air)
1600°–1617° C. at 60° C./hr (under air)
1617°–1000° C. at 240° C./hr (under air)
1000° C.—ambient at 360° C./hr (under air).

It is a feature of the invention, as described with reference to the drawings, and Example, that it provides a simple and inexpensive method of making an envelope of the type in question, which lends itself to mass production.

Naturally, while the method of the present invention has been described above for ceramic holders or envelopes of solid electrolyte material for use in electrochemical cells, it can in principle be employed for making similar holders or envelopes from other ceramic materials and for other purposes.

I claim:

1. A method of making a holder of ceramic material the method comprising the steps of:
   locating at least one core in a mass of particulate ceramic material or particulate precursor thereof;
   compressing and consolidating the particulate material around each core so that the core is at least partially embedded therein;
   removing each core from the consolidated mass of particulate material to leave a green artifact having a cavity therein; and
   sintering the green artifact to produce a sintered unitary artifact of ceramic material having at least one cavity therein for containing a liquid,
   each core being shaped and the particulate material being arranged such that at least part of each core is in the form of a thin slab or layer sandwiched between a pair of layers of the particulate material so that, after the sintering, at least part of each cavity is in the form of a thin gap between opposed plates of sintered ceramic material, each slab or layer having at least one opening therethrough which is filled with the particulate material, the particulate material in each opening, after consolidation thereof in the gap by the compressing and after the sintering, forming a bridge across the gap between the associated plates and sintered thereto, the bridge being capable of acting as a strut or tie between the associated plates, for reinforcing the holder, at least one said core being provided, at least at its surface and embedded in the core material, with particles of a wicking material or its precursor, so that the sintering provides, at least on the inner surface of the cavity left by said core, porous wicking material for wicking a liquid held by the holder.

2. A method as claimed in claim 1, in which each slab or layer employed has a plurality of openings therethrough, the openings being spaced from one another so that, after the sintering, the plates are joined together by a matrix of said bridges, spaced from one another.

3. A method as claimed in claim 2, in which each opening is shaped so that the bridges are in the form of short columns or pillars, evenly spaced from one another and distributed over the full extent of the gap.

4. A method as claimed in claim 1, in which each core comprises at least one unitary slab, each opening being shaped so that it is in the form of a passage whose walls are radially inwardly convexly curved in sectional side elevation, each passage having a pair of entrances respectively at opposite ends thereof, and each entrance being countersunk so that it tapers axially inwardly into the passage, each slab having a peripheral edge which is convexly curved and rounded.

5. A method as claimed in claim 1, in which the ceramic material is solid electrolyte material for holding active electrode material in a high temperature electrochemical power storage cell, each core being entirely surrounded by the particulate material so that, after the compressing, it is fully embedded in the consolidated particulate material, and so that the sintering results in an artifact having a closed cavity therein and the method including forming a loading opening into the cavity from the exterior of the holder after the sintering.

6. A method as claimed in claim 1, in which the compressing is carried out at a temperature of between $-10°$ C. and $+500°$ C. and at a pressure of 30–310 MPa. the method including the step of admixing 0,5–30% by mass of an organic binder with the particulate material prior to locating each core therein, and the sintering acting to drive off the binder.

7. A method as claimed in claim 1, in which there are two opposed cores in the form of slabs, spaced apart face-to-face by a layer of the particulate material, the cores being respectively of different thicknesses.

8. A method as claimed in claim 1, in which there are three opposed cores in the form of slabs, spaced apart face-to-face respectively by two layers of the particulate material, there being a central core located between and spaced from two outer cores, the central core being thicker than the outer cores.

9. A method as claimed in claim 7, in which, when the cores are located in the particulate ceramic material, the thicker core is spaced by at least one spacer of core material from each other core, each spacer leaving, after the sintering, a duct in the artifact whereby the cavity left by the thicker core is placed in communication with each other cavity.

* * * * *